(No Model.)
J. J. NICHOLS.
BIRD CAGE.
No. 244,284. Patented July 12, 1881.
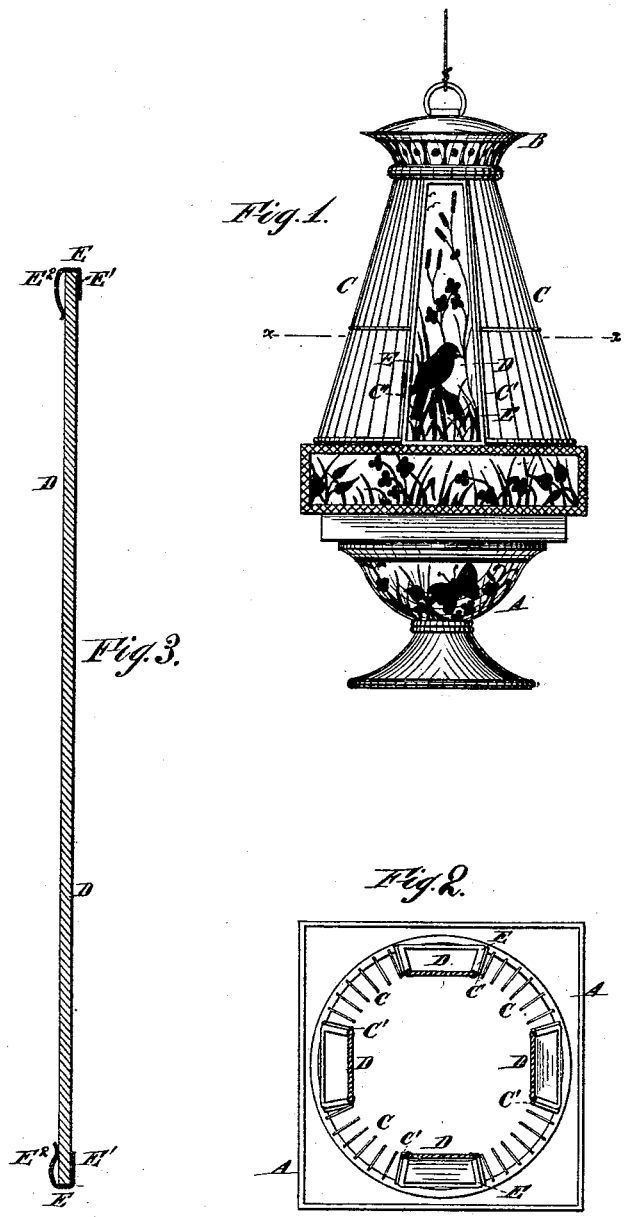

UNITED STATES PATENT OFFICE.

JACOB J. NICHOLS, OF BROOKLYN, NEW YORK.

BIRD-CAGE.

SPECIFICATION forming part of Letters Patent No. 244,284, dated July 12, 1881.

Application filed May 13, 1881. (No model.)

*To all whom it may concern:*

Be it known that I, JACOB J. NICHOLS, a citizen of the United States, residing in Brooklyn, in the county of Kings and State of New York, have invented certain new and useful Improvements Relating to Bird-Cages, of which the following is a specification.

I make the bird-cage with its sides partly of wires, arranged in the ordinary manner, and partly of solid plates, so as to add materially to the attractive appearance of the cage. The plates also afford positive advantages in serving as shields, by which the bird may protect itself against injurious drafts of air, too intense sunshine, &c.

The following is a description of what I consider the best means of carrying out the invention.

The accompanying drawings form a part of this specification.

Figure 1 is a general side elevation. Fig. 2 is a section on the line $x\ x$ in Fig. 1. Fig. 3 is a vertical section through one of the solid pieces or panels and its inclosing framing on a larger scale.

Similar letters of reference indicate like parts in all the figures.

A is the base, represented as of considerable depth, and of ornamental form, decorated; but these points may be varied. It is sufficient that there be a base, of any ordinary or suitable form, adapted to serve as the lower portion of a bird-cage, to be surmounted by the open-work of the cage proper. The base may be partly or entirely transparent; but I will describe it as opaque—a practically continuous and close structure of metal.

B is a top, which may be correspondingly formed. It is represented as of smaller size than the base. C C, &c., are bars of sufficiently stout wires, firmly fixed at the top and bottom, and at one or more intermediate points, if desired. They may be mounted in any ordinary or suitable manner, and serve the ordinary functions of the corresponding part of a bird-cage.

D D D D are solid flat pieces of the white translucent metal or material known as "opaline glass," or, more briefly, "opal." They are tapered, being narrowest at the top. Each is confined within a close-fitting frame or border of sheet-brass, E, having on the outer face a turned-in edge or border, E', smooth and rigid, and on the inner face foldable edges $E^2$, which may be bent to allow the insertion and removal of the opal.

The bars C', immediately adjacent to the frames D, are somewhat stouter than the other wires, and three of the frames D are firmly secured thereto by soldering, or otherwise. The fourth is hinged, and provided with a suitable catch to serve as a door.

Those portions of the inclosure which are formed by the wires C serve in the usual manner. Those portions which are formed by the plates of decorated opal contribute to the artistic and decorative appearance of the cage, and contribute greatly to the strength and stiffness of the structure, and afford shields, of which the bird may take advantage when exposed to injurious influences, as a too hot sun or an uncomfortable draft of wind.

The decorations on the opal shields D are in bright mineral colors burned in. A peculiarly soft and rich effect is produced by the insertion of these plates.

Modifications may be made. The top and bottom of the cage may be of the same size, and may be variously formed and decorated. The cage may be square or of various other forms instead of round, as shown. There may be a greater or less number of the opal shields. Instead of opaline glass or opal, the solid plates or shields may be other glass, translucent metal, or even ornamental wood. Any durable material which is decorative or may be made so can be employed.

Parts of the invention may be used without the whole. The shields D may be applied in other means than by the sheet-metal frames E E' $E^2$. With opaque material the ordinary bars need not be omitted in those spaces, the plates D being applied exterior thereto.

I claim as my invention—

The bird-cage described, having a portion of the inclosure composed of bars C, and other portions of solid plates D, formed and applied substantially as herein specified.

In testimony whereof I have hereunto set my hand at New York city this 7th day of April, 1881, in the presence of two subscribing witnesses.

J. J. NICHOLS.

Witnesses:
W. COLBORNE BROOKES,
W. S. McLEWEE.